United States Patent
Hamano

(10) Patent No.: US 9,456,119 B2
(45) Date of Patent: Sep. 27, 2016

(54) FOCUSING APPARATUS CAPABLE OF CHANGING A DRIVING AMOUNT OF A FOCUS LENS BASED ON FOCUS DETECTION RESULTS ACQUIRED AT DIFFERENT FOCUS POSITIONS

(71) Applicant: CANON KABUSHIKI KAISHA, Tokyo (JP)

(72) Inventor: Hideyuki Hamano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/785,579

(22) Filed: Mar. 5, 2013

(65) Prior Publication Data

US 2013/0242172 A1 Sep. 19, 2013

(30) Foreign Application Priority Data

Mar. 14, 2012 (JP) ................................ 2012-057046

(51) Int. Cl.
| | | |
|---|---|---|
| G03B 13/00 | (2006.01) | |
| H04N 5/232 | (2006.01) | |
| H04N 5/369 | (2011.01) | |
| G03B 3/00 | (2006.01) | |
| H04N 5/3745 | (2011.01) | |
| G03B 13/32 | (2006.01) | |
| G03B 13/36 | (2006.01) | |

(52) U.S. Cl.
CPC ............ *H04N 5/23212* (2013.01); *G03B 3/00* (2013.01); *H04N 5/3696* (2013.01); *H04N 5/37457* (2013.01); *G03B 13/32* (2013.01); *G03B 13/36* (2013.01)

(58) Field of Classification Search
CPC .............. G03B 13/32–13/36; H04N 5/23212; H04N 5/3696
USPC ................................................. 348/349–351
See application file for complete search history.

(56) References Cited

U.S. PATENT DOCUMENTS

| | | | | |
|---|---|---|---|---|
| 7,652,713 | B2 * | 1/2010 | Yamasaki ..................... | 348/345 |
| 7,863,550 | B2 * | 1/2011 | Kusaka ..................... | 250/201.8 |
| 8,149,324 | B2 * | 4/2012 | Oikawa ......................... | 348/349 |
| 8,310,590 | B2 * | 11/2012 | Kusaka ......................... | 348/364 |
| 8,363,153 | B2 * | 1/2013 | Tsukada ....................... | 348/350 |
| 8,670,063 | B2 * | 3/2014 | Wakamiya et al. .......... | 348/349 |
| 8,831,420 | B2 * | 9/2014 | Miyatani ............... | G03B 13/36 |
| | | | | 396/104 |
| 8,860,872 | B2 * | 10/2014 | Isobe ............................ | 348/349 |
| 2004/0179128 | A1 * | 9/2004 | Oikawa ........................ | 348/345 |
| 2008/0198257 | A1 * | 8/2008 | Morimoto .................... | 348/345 |
| 2009/0295964 | A1 * | 12/2009 | Utagawa et al. ............. | 348/302 |
| 2014/0039257 | A1 * | 2/2014 | Higuchi ................. | G02B 7/34 |
| | | | | 600/109 |

FOREIGN PATENT DOCUMENTS

JP 2008-052009 3/2008

* cited by examiner

*Primary Examiner* — Ngoc-Yen Vu
(74) *Attorney, Agent, or Firm* — Cowan, Liebowitz & Latman, P.C.

(57) ABSTRACT

A focusing apparatus with a photoelectric converter which photoelectrically converts at least a pair of optical images formed by light fluxes that have passed a focus lens to output at least a pair of image signals, a phase difference detector which detects a phase difference between the pair of output image signals, and a driving amount calculator which calculates a driving amount of the focus lens based upon the detected phase difference. The driving amount calculator changes the calculated driving amount, in accordance with a first driving amount corresponding to a detected phase difference when the focus lens is located at a first position, a second driving amount corresponding to the detected phase difference when the focus lens is located at a second position, and a relationship between the first and second positions.

10 Claims, 10 Drawing Sheets

PLANE VIEW

| ABSOLUTE VALUE \|E\| OF THE EVALUATION VALUE OF THE AF RESULT RELIABILITY | LENS DRIVING AMOUNT COEFFICIENT K2 | LENS DRIVING AMOUNT COEFFICIENT K3 |
|---|---|---|
| A<\|E\|≤B | 0.75 | 0.7 |
| B<\|E\|≤C | 0.9 | 0.5 |
| C<\|E\|≤D | 1.2 | 0.25 |

PLANE VIEW         A-A SECTIONAL VIEW

PLANE VIEW           A-A SECTIONAL VIEW

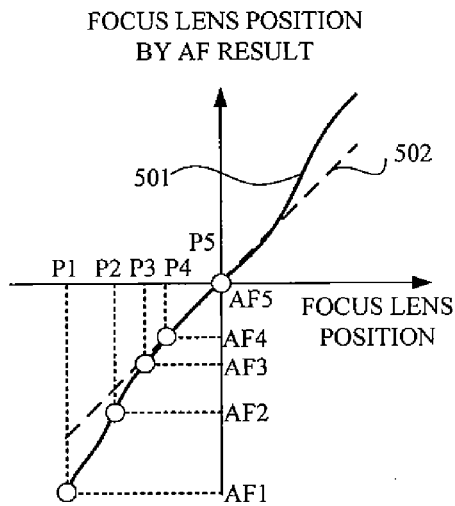
FIG. 10A
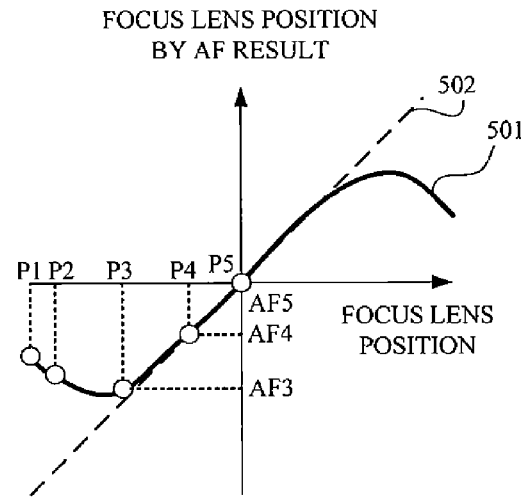
FIG. 10B
| ABSOLUTE VALUE \|E\| OF THE EVALUATION VALUE OF THE AF RESULT RELIABILITY | LENS DRIVING AMOUNT COEFFICIENT K2 | LENS DRIVING AMOUNT COEFFICIENT K3 |
|---|---|---|
| A<\|E\|≤B | 0.75 | 0.7 |
| B<\|E\|≤C | 0.9 | 0.5 |
| C<\|E\|≤D | 1.2 | 0.25 |
FIG. 11

FOCUSING APPARATUS CAPABLE OF CHANGING A DRIVING AMOUNT OF A FOCUS LENS BASED ON FOCUS DETECTION RESULTS ACQUIRED AT DIFFERENT FOCUS POSITIONS

BACKGROUND OF THE INVENTION

1. Field of the Invention

The present invention relates to a focusing apparatus provided in a digital camera, a video camera, etc.

2. Description of the Related Art

As a method for detecting a focus state of an image pickup lens, Japanese Patent Laid-Open No. ("JP") 2008-52009 discloses an apparatus configured to provide a pupil splitting focus detection using a two-dimensional sensor in which a micro lens is formed for each pixel of the sensor. In this apparatus, a photoelectric converter of each pixel in the sensor is divided into a plurality of sections, and each divided photoelectric converter receives light from a different pupil area of the image pickup lens via the micro lens. A correlation is calculated between a pair of output waveforms of the photoelectric converters that have received light from different pupil areas of the image pickup lens, and a defocus amount is calculated from the phase difference.

However, such a focus detecting method in which the light from the different pupil area of the image pickup lens is received via the micro lens, is influenced by light shielding by the image pickup lens due to the optical performance of the micro lens. When the light is shielded by the image pickup lens, a difference between in the pair of output waveform shapes used for the correlative operation increases an error contained in the calculated defocus amount. In addition, since the light shielding by the image pickup lens varies according to manufacturing errors, the unsteadiness of the apparatus, and variations with time, etc., it is difficult to remove a harmful influence on the focus detection caused by the light shielding, only by making adjustments concerning the light shielding in the manufacture.

For this harmful influence caused by the light shielding, JP 2008-52009 discloses a focusing apparatus configured to calculate a final defocus amount using a defocus amount obtained with a different diaphragm aperture diameter in the image pickup lens. When a plurality of candidate defocus amounts are derived from an output signal with a certain diaphragm aperture diameter, JP 2008-52009 again receives light with a different diaphragm aperture diameter, and calculates a defocus amount from the obtained output signal. A first calculated defocus amount candidate is compared with a second calculated defocus amount candidate with each other, and an approximately equal defocus amount is selected as a correct defocus amount. Thus, the reliability of the defocus amount is determined based upon a plurality of defocus amounts each obtained with a diaphragm aperture diameter.

It is known that as the calculated defocus amount increases, the detecting error generally increases. In order to reduce the influence of the detecting error when a detected defocus amount is large, there is known a method of resuming a focus detection by driving a lens with a driving amount smaller than that for the detected defocus amount. According to this method, the lens gradually approaches to the in-focus position with reduced influence of the detecting error.

However, the prior art disclosed in JP 2008-52009 needs to repeat the step of receiving light and of calculating a defocus amount a plurality of times so as to obtain a highly reliable defocus amount, requiring a long time for focusing.

In addition, the above control with a lens driving amount smaller than that for the detected defocus amount increases the number of detections of the defocus amount, requiring a long time for focusing. This problem can be solved if the reliability of the detected defocus amount can be determined. However, if the prior art disclosed in JP 2008-52009 continues focusing until the in-focus state is obtained, a longer time becomes necessary.

SUMMARY OF THE INVENTION

The present invention provides a focusing apparatus that can accelerate focusing.

A focusing apparatus according to the present invention includes a photoelectric converter configured to photoelectrically convert at least a pair of optical images formed by light fluxes that have passed a focus lens and to output at least a pair of image signals, a phase difference detector configured to detect a phase difference between the pair of image signals output from the photoelectric converter, and a driving amount calculator configured to calculate a driving amount of the focus lens based upon the phase difference detected by the phase difference detector. The driving amount calculator changes the driving amount of the focus lens calculated based upon the phase difference, in accordance with a first driving amount of the focus lens corresponding to a phase difference detection result by the phase difference detector when the focus lens is located at a first position, a second driving amount of the focus lens corresponding to the phase difference detection result by the phase difference detector when the focus lens is located at a second position, and a relationship between the first position and the second position.

Further features of the present invention will become apparent from the following description of exemplary embodiments with reference to the attached drawings.

BRIEF DESCRIPTION OF THE DRAWINGS

FIGS. 10A and 10B are views illustrating a relationship between a focus lens position and an AF result according to a second embodiment.

FIG. 11 is a table of a set value when a lens driving amount coefficient is classified.

DESCRIPTION OF THE EMBODIMENTS

Referring now to the accompanying drawings, a description will be given of embodiments according to the present invention.

First Embodiment

A description will now be given of an example in which a focusing apparatus according to a first embodiment is applied to a single-lens reflex digital camera in which a lens is exchangeable.

Figure 2:
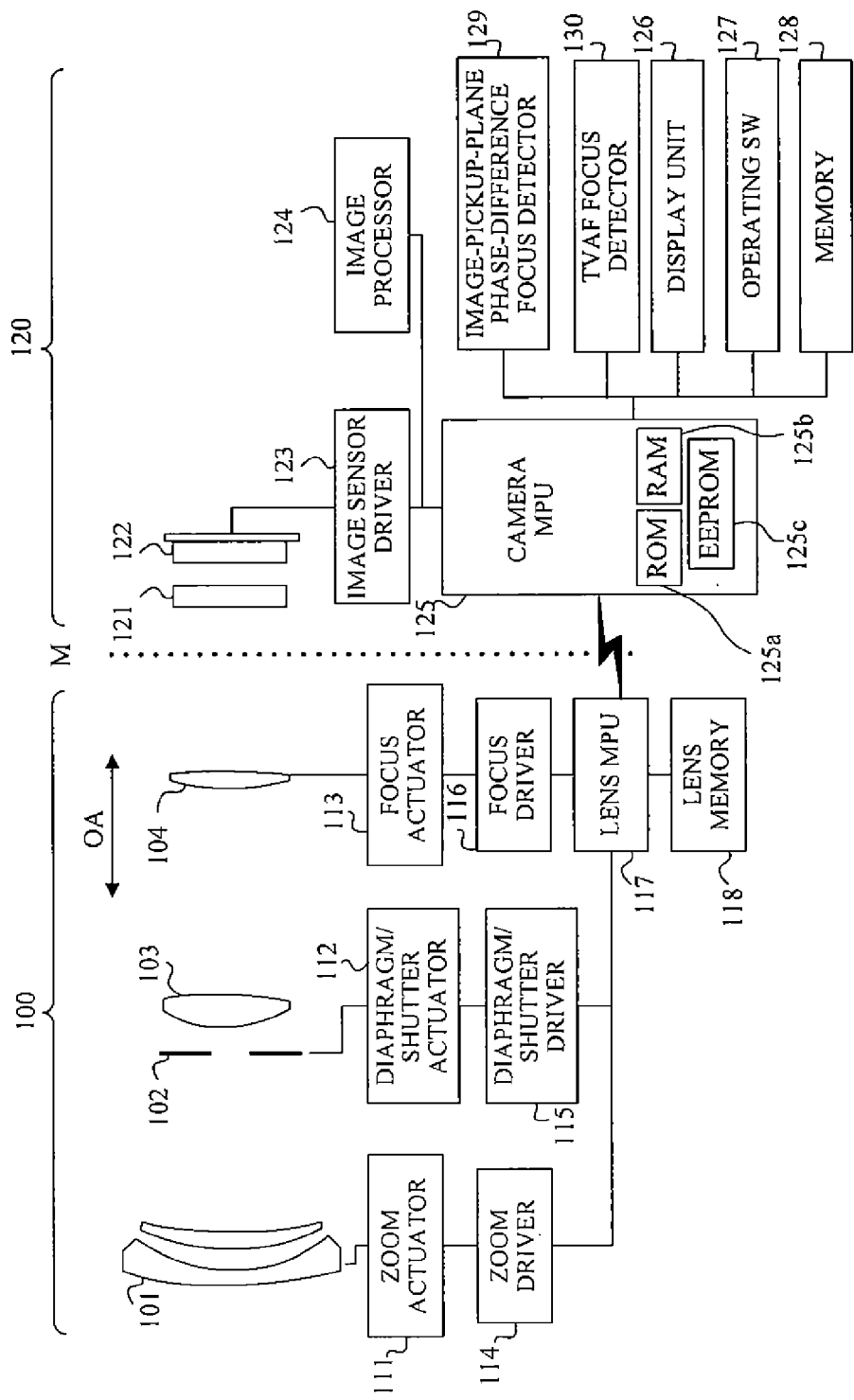
FIG. 2 is a block diagram of a digital camera according to the present invention.

FIG. 2 is a block diagram of the digital camera according to this embodiment. The digital camera of this embodiment is an interchangeable lens type single-lens reflex camera (camera system), and includes a lens unit (lens apparatus) 100 and a camera body (image pickup apparatus) 120. The lens unit 100 is connected with the camera body 120 via a mount M illustrated by a dotted line at the center of FIG. 2.

The lens unit 100 includes a first lens unit 101, a diaphragm/shutter 102, a second lens unit 103, a focus lens unit (simply referred to as a "focus lens" hereinafter) 104, and a driving/control system. This lens unit 100 includes an image pickup lens that includes focus lens 104 and forms an object image.

The first lens unit 101 is closest to the object in the lens unit 100, and held movable back and forth in the optical axis direction OA. The diaphragm/shutter 102 controls a light quantity in taking an image by adjusting the opening diameter, and serves as a shutter configured to control the exposure time in taking a still image. The diaphragm/shutter 102 and the second lens unit 103 move together back and forth in the optical axis direction OA, and realizes a zoom function by an association with the back and forth movements of the diaphragm/shutter 101. The focus lens 104 moves back and forth in the optical axis direction OA for focusing.

The driving/control system includes a zoom actuator 111, a diaphragm/shutter actuator 112, a focus actuator 113, a zoom driver 114, a diaphragm/shutter driver 115, a focus driver 116, a lens MPU 117, and a lens memory 118.

The zoom actuator 111 moves the first lens unit 101 and the third lens unit 103 back and forth in the optical axis direction OA for zooming. The diaphragm/shutter actuator 112 controls an aperture diameter of the diaphragm/shutter 102 so as to adjust the image pickup light quantity, and it also controls the exposure time in the still image pickup.

The focus actuator 113 moves the focus lens 104 back and forth in the optical axis direction OA for focusing. The focus actuator 113 also serves as a position detector configured to detect a current position of the focus lens 104.

The zoom driver 114 drives the zoom actuator 111 in accordance with a zoom manipulation by a photographer. The diaphragm/shutter driver 115 controls driving of the diaphragm/shutter actuator 112 and thereby the opening of the diaphragm/shutter 102.

The focus driver 116 controls driving of the focus actuator 113 based upon the focus detection result, and provides focusing by moving the focus lens 104 back and forth in the optical axis direction OA.

The lens MPU 117 provides all calculations and controls relating to the image pickup lens, and controls the zoom driver 114, the diaphragm/shutter driver 115, the focus driver 116, and the lens memory 118. The lens MPU 117 detects the current lens position, and informs the camera MPU 125 of lens positional information in response to a request from the camera MPU 12. The lens memory 118 stores optical information necessary for autofocusing.

The camera body 120 includes an optical low-pass filter 121, an image sensor (photoelectric converter) 122, and a driver/control system.

The optical low-pass filter 121 and the image sensor 122 serve as an image pickup system configured to form an object image using a light flux from the lens unit 100. In this embodiment, the first lens unit 101, the diaphragm/shutter 102, the second lens unit 103, the focus lens 104, and the optical low-pass filter 121 serve as an image pickup optical system. The image sensor 122 serves as a photoelectric converter. It is necessary for focusing to drive part of the image pickup optical system, and this embodiment drives the focus lens 104. The focus actuator 113 serves as a driver. However, focusing may be performed by driving the image sensor 122.

The optical low-pass filter 121 reduces a false color and moiré in a taken image. The image sensor 122 includes a C-MOS sensor and its peripheral circuit, and one photoelectric conversion element is arranged on a light receiving pixel having m pixels in the horizontal direction and n pixels in the vertical direction. The image sensor 122 is configured so that all pixels can provide independent outputs. In addition to the image pickup pixels, some pixels serve as focus detecting pixels so as to provide phase difference detection type focus detections on the image pickup plane (image-pickup-plane phase-difference AF).

More specifically, the image sensor 122 includes a plurality of image pickup pixels each of which receives light that passes the entire area of the exit pupil of the image pickup optical system configured to form an optical image of an object, and generates an image signal of the object. The image sensor 122 further includes a plurality of focus detecting pixels each of which receives light that passes part of the exit pupil of the image pickup optical system (in other words, a different area of the exit pupil). The plurality of focus detecting pixels as a whole can receive the light that passes the entire area of the exit pupil of the image pickup lens. For example, in 2×2 pixels in the image sensor 122, a pair of diagonal G pixels is left as image pickup pixels and R and B pixels are replaced with focus detecting pixels. Thus, the image sensor 122 of this embodiment can photoelectrically convert at least a pair of optical images formed by light fluxes that have passed different areas of the pupil in the image pickup optical system and to output at least a pair of image signals.

The driving/control system includes an image sensor driver 123, an image processor 124, a camera MPU 125, a display unit 126, operating switches (SWs) 127, a memory 128, an image-pickup-plane phase-difference focus detector 129, and a TVAF focus detector 130.

The image sensor driver 123 controls an operation of the image sensor 122, provides an A/D conversion to an obtained image signal, and sends the digital signal to the camera MPU 125. The image processor 124 provides a γ conversion, a color interpolation, and a JPEG compression to the image obtained by the image sensor 122.

The camera MPU (processor) 125 provides all operations and controls relating to the camera body 120, and controls the image sensor driver 123, the image processor 124, the display unit 126, the operating SWs 127, the memory 128, the image-pickup-plane phase-difference focus detector 129, and the TVAF focus detector 130. The camera MPU 125 is connected to the lens MPU 117 via the signal lines of the mount M, and requests the lens MPU 117 for a lens position and optical information peculiar to the lens unit 100, and requests the lens MPU 117 to drive the lens with a predetermined driving amount. The camera MPU 125 includes a ROM 125a that stores a program used to control the camera operations, a RAM 125b that stores variables, and an EEPROM 125c that stores a variety of parameters.

Moreover, the camera MPU 125 executes focus detecting processing using the program stored in the ROM 125a. A detailed description of the focus detecting processing will be given later. In addition, the camera MPU 125 corrects the lowered reliability in the image-pickup-plane phase-difference AF when the focus detecting position has a high image height subject to the influence of the light shielding.

The display unit 126 includes an LCD or the like, and displays information relating to an image pickup mode of the camera, a preview image before the image is captured and a confirmation image after the image is captured, and a focus state representing image in the focus detection. The operating SWs 127 include a power switch, a release switch (image pickup trigger) switch, a zooming switch, an image pickup mode selecting switch, etc. The memory 128 of this embodiment is a detachable flash memory, and stores a captured image.

The image-pickup-plane phase-difference focus detector 129 provides the phase difference detection type focus detecting processing using the image signal from the focus detecting pixel in the image sensor 122. More specifically, the image-pickup-plane phase-difference focus detector 129 provides an image-pickup-plane phase-difference AF based upon a shift amount between the pair of images formed on the focus detecting pixels by the light fluxes that have passed the pair of pupil areas in the image pickup optical system. A detailed description will be given of the method of the image-pickup-plane phase-difference AF later. The image-pickup-plane phase-difference focus detector 129 serves as a phase difference detector.

The TVAF focus detector 130 performs contrast type focus detection processing using a contrast component of image information obtained by the image processor 124. The contrast type focus detecting processing moves the focus lens 104, and detects a focus lens position that provides a peak of the contrast evaluation value.

Thus, this embodiment combines the image-pickup-plane phase-difference AF with the TVAF, and uses them selectively or in combination in accordance with a situation.

Figure 3:
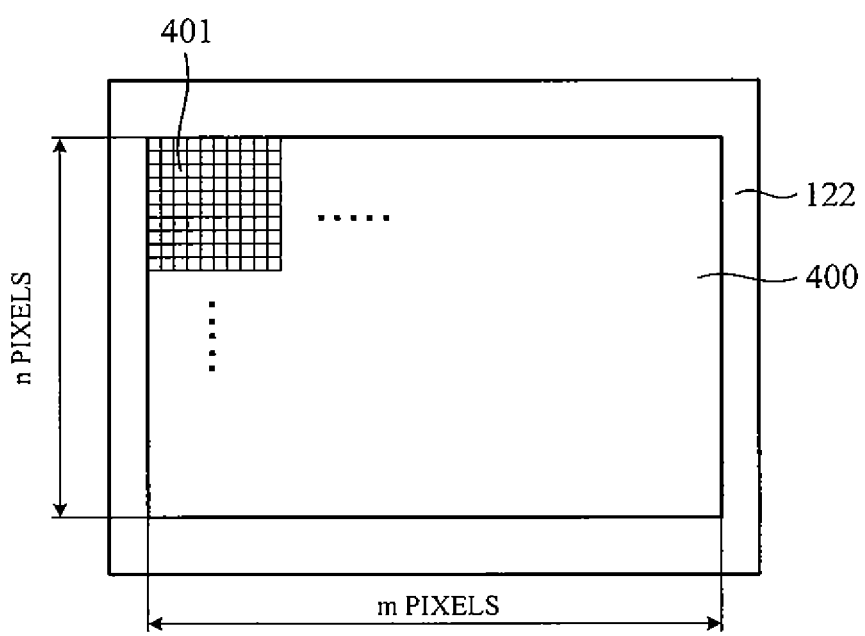
FIG. 3 is a plane view of light receiving pixels from the lens unit 100 side.

Next follows a description of the focus detector using the image sensor 122. FIG. 3 is a plane view of light receiving pixels viewed from the lens unit 100 in which an object image is formed in the image sensor 122 in the block diagram of the digital camera in FIG. 2. Reference numeral 400 denotes an image pickup range formed on the image sensor 122 that has a size of m pixels in the horizontal direction and n pixels in the vertical direction. Reference numeral 401 denotes one pixel section. In each pixel section, an on-chip color filter is formed with a Bayer arrangement at a 2×2 four-pixel period. FIG. 3 illustrates only 10×10 pixel sections on the upper left side for simplicity purposes, and other pixel sections are omitted.

Figure 1:
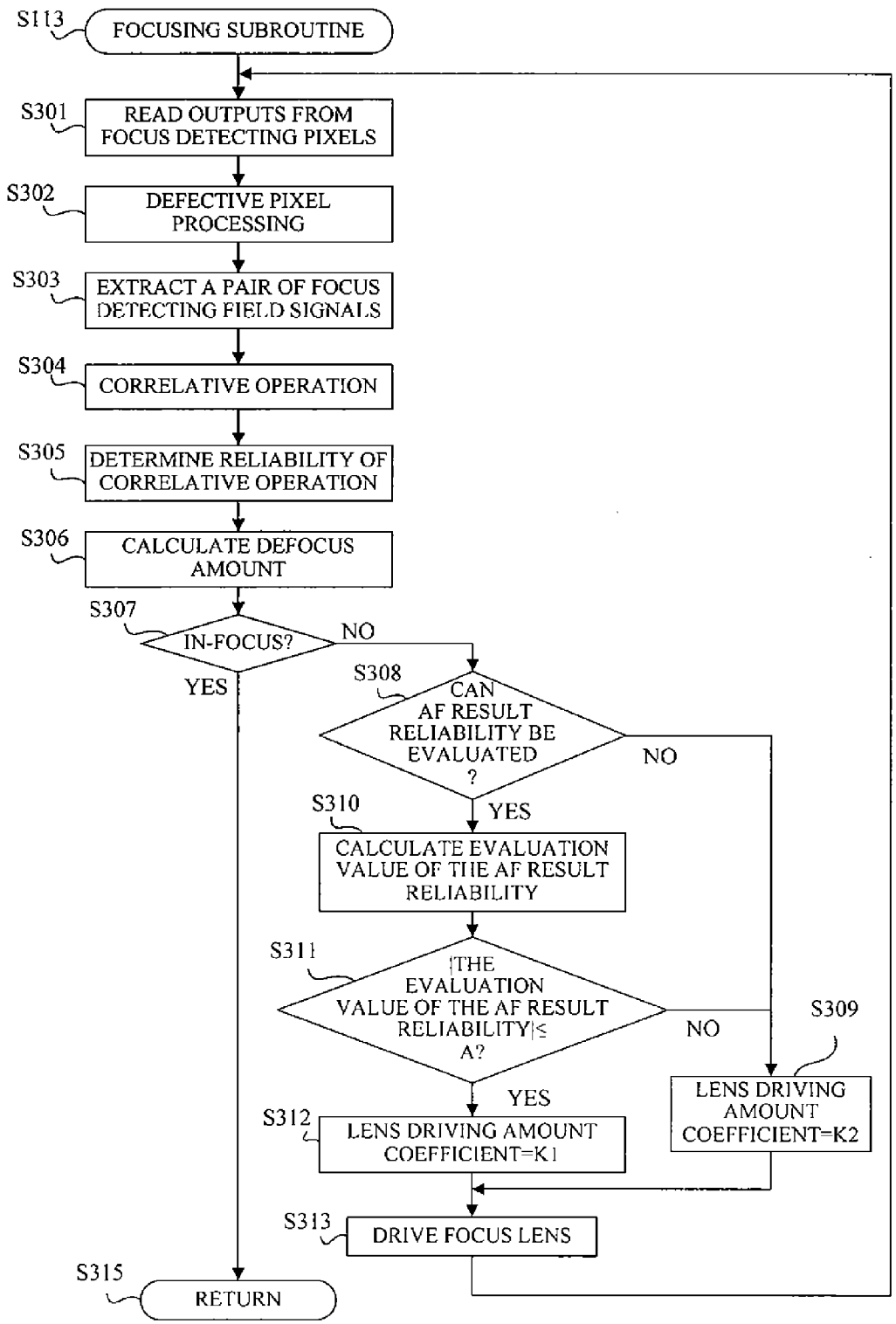
FIG. 1 is a flowchart of a focusing subroutine according to a first embodiment.
Figure 4A:
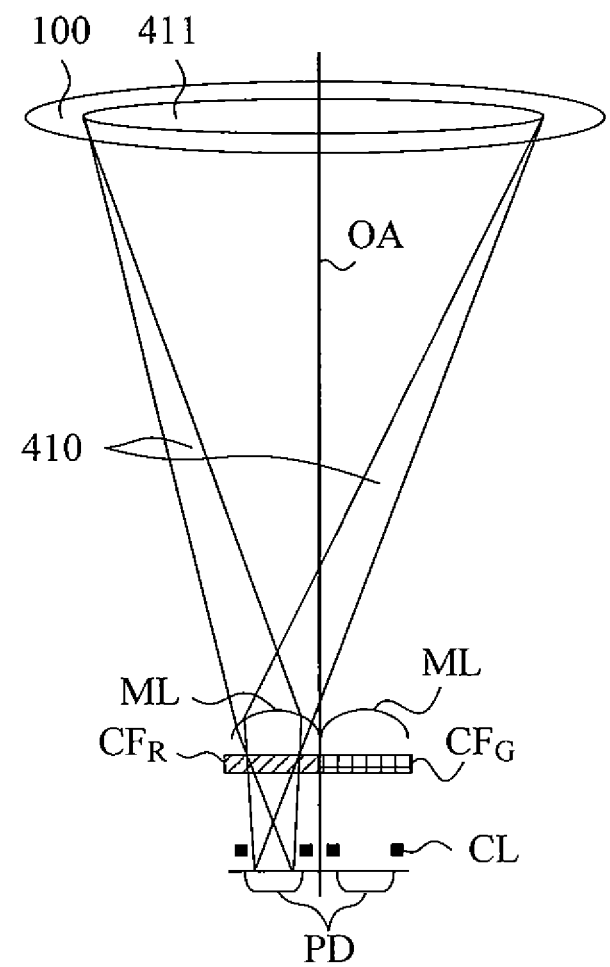
FIGS. 4A and 4B are views for explaining a structure of an image pickup pixel in an image sensor.
Figure 4B:
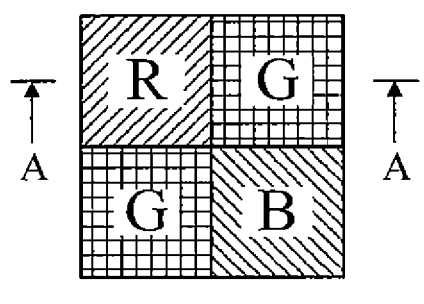
Figure 5A:
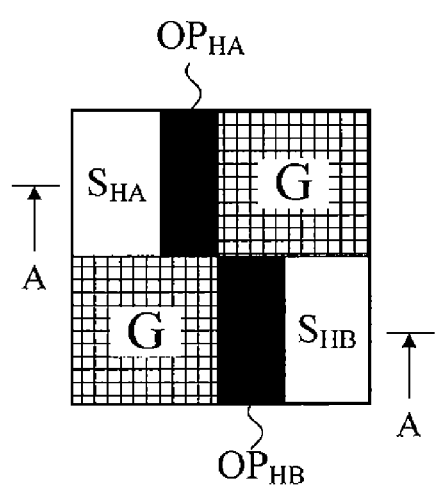
FIGS. 5A and 5B are views for explaining a structure of a focus detecting pixel in the image sensor.
Figure 5B:
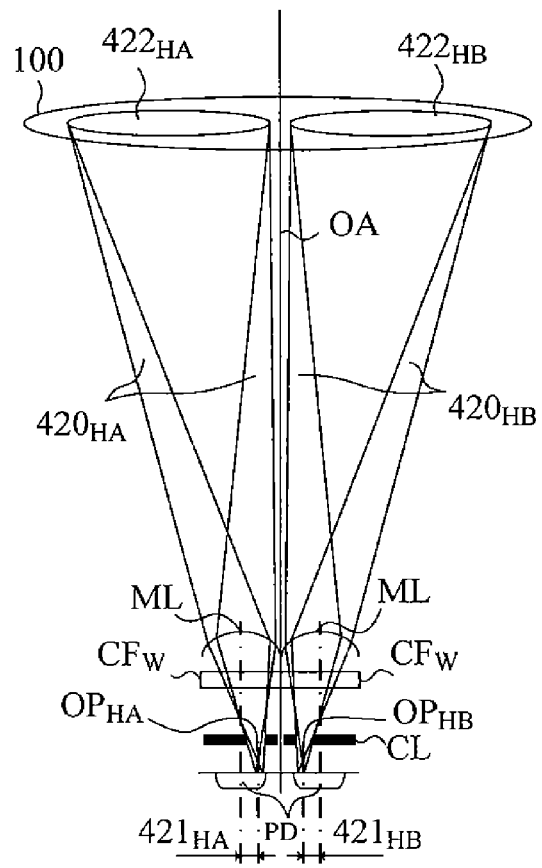

FIGS. 4A, 4B, 5A, and 5B are views for explaining structures of the image pickup pixels and focus detecting pixels in the pixel section in FIG. 3, and FIGS. 4B and 5B are optical sectional views of the lens unit 100 and the image sensor 122 illustrated in FIG. 1, viewed from the top of FIG. 2. Herein, the lens unit 100 is virtually illustrated as a single lens. Components unnecessary for the description are omitted. This embodiment adopts a Bayer arrangement in which pixels having spectral sensitivity of G (green) are arranged on diagonal two pixels and pixels having spectral sensitivities of R (red) and B (blue) are arranged on the other two pixels respectively in the four pixels of two rows×two columns. The focus detecting pixels having the following structure are arranged in this Bayer arrangement.

FIGS. 4A and 4B illustrate arrangements and structures of the image pickup pixel. FIG. 4A is a plane view of the 2×2 image pickup pixels. In the Bayer arrangement, the G pixels are arranged in the diagonal direction and R and B pixels are arranged in the other two diagonal pixels. The 2×2 structure is repetitively arranged. In FIG. 4B that is a A-A sectional view of FIG. 4A, ML denotes an on-chip micro lens arranged on the forefront plane of each pixel, $CF_R$ denotes an R (red) color filter, and $CF_G$ denotes a G (green) color filter. PD (photo diode) schematically illustrates a photoelectric conversion element of a CMOS image sensor. CL (contact layer) denotes a wire layer used to form a signal line that transmits various signals in the CMOS image sensor. FIGS. 4A and 4B illustrate pixels near the center of the image sensor 122 or pixel structures near the optical axis OA of the lens unit 100.

The on-chip micro lens ML and the photoelectric conversion element PD for the image pickup pixel are adapted to effectively capture a light flux that has passed the lens unit 100. In other words, the exit pupil 411 and the photoelectric conversion element PD of the lens unit 100 have a conjugate relationship by the micro lens ML and the effective area of the photoelectric conversion element is designed to be large. The light flux 410 in FIG. 4B illustrates that status, and the entire area of the exit pupil 411 is captured by the photoelectric conversion element PD. While FIG. 4B illustrates an incident light flux upon the R pixel, each of the G pixel and B (blue) pixel has the same structure. In addition, the component around the micro lens ML is enlarged and displayed for better understanding of the description, but it actually has a shape of the micrometer order.

FIGS. 5A and 5B illustrate an arrangement and structure of the focus detecting pixel so as to provide pupil splitting in the horizontal (lateral) direction of the lens unit 100. The horizontal direction corresponds to a longish direction of the image sensor 122 illustrated in FIG. 3. FIG. 5A is a plane view of 2×2 pixels which contain the focus detecting pixels. When an image signal is obtained for recording or viewing, a major component of brightness information is obtained by the G pixels. Since the human image recognition characteristic is sensitive to the brightness information, the image degradation is likely to be recognized when the G pixel is defective or lost. On the other hand, the R or B pixel is a pixel used to obtain color (difference) information, but the human visual sense characteristic is less sensitive to the color information. Thus, the image degradation is less likely to be recognized even when a few pixels used to obtain the color information are lost or defective. Accordingly, this embodiment keeps the G pixels as the image pickup pixels and sets the R and B pixels to the focus detecting pixels in the 2×2 pixels. The focus detecting pixels are illustrated as $S_{HA}$ and $S_{HB}$ in FIG. 5A.

FIG. 5B illustrates an A-A sectional view of FIG. 5A. The micro lens ML and the photoelectric conversion element PD have the same structure as those for the image pickup pixel illustrated in FIG. 4B. FIG. 5B illustrates pixels near the center in the image sensor 122 or the pixel structure near the optical axis OA of the lens unit 100. This embodiment does not utilize the signal from the focus detecting pixel to generate an image, and arranges a transparent film $CF_W$ (white color) instead of the color filter for color separations. In order to divide the exit pupil 411 using the image sensor, the opening of the wire layer CL is decentered in one direction with respect to the centerline of the micro lens ML. More specifically, since an opening $OP_{HA}$ of the pixel $S_{HA}$ decenters to the right side by $421_{HA}$ with respect to the centerline of the micro lens ML, the pixel $S_{HA}$ receives a light flux $420_{HA}$ from the left exit pupil area $422_{HA}$ with respect to the optical axis OA of the lens unit 100. Similarly, since an opening $OP_{HB}$ of the pixel $S_{HB}$ decenters to the left side by $421_{HB}$ with respect to the centerline of the micro lens ML, the pixel $S_{HB}$ receives a light flux $420_{HB}$ from the right exit pupil area $422_{HB}$ with respect to the optical axis OA of the lens unit 100. As evident from FIGS. 5A and 5B, the decentering amount $421_{HA}$ is equal to the decentering amount $421_{HB}$. Hence, the light fluxes 420 that have passed the different pupil areas of the lens unit 100 as the image pickup lens due to decentering between the micro lens ML and the opening OP can be extracted.

With such a structure, a plurality of pixels $S_{HA}$ are arranged in the horizontal direction, and an object image obtained by these pixels will be referred to as an A image. A plurality of pixels $S_{HB}$ are also arranged in the horizontal direction, and an object image obtained by these pixels will be referred to as an B image. By detecting relative positions of the A image and B image, a defocus amount of the object image can be detected. Therefore, the image sensor 122 serves as a focus detector.

FIGS. 5A and 5B illustrates the focus detecting pixels near the center of the image sensor 122, but in the area other than the center the exit pupil 411 can be divided by decentering the openings $OP_{HA}$ and $OP_{HB}$ of the wire layer CL and the micro lens ML at different states from that of FIG. 5B. More specifically, when the opening $OP_{HA}$ is used for an illustrative explanation, decentering is made so as to accord the spherical center of the approximately spherical micro lens ML with the line that is made by connecting the center of the opening $OP_{HA}$ and the center of the exit pupil area to each other. Thereby, pupil splitting approximately equivalent with that for the focus detecting pixel near the center illustrated in FIGS. 5A and 5B is available even in the periphery of the image sensor 122.

The pixels $S_{HA}$ and $S_{HB}$ can provide a focus detection of an object having a brightness distribution in the horizontal direction in the image pickup screen, such as a vertical line, but cannot provide a focus detection of a horizontal line having a brightness distribution in the vertical direction. In order to provide a focus detection of an object having a brightness distribution in the vertical direction of the image pickup screen, pupil splitting pixels may be provided in the vertical direction (longitudinal direction) of the image pickup optical system. This embodiment provides a structure of focus detecting pixels both in the vertical and horizontal directions. In addition, since the focus detecting pixel does not originally have color information, a signal is prepared through correlative calculation using signals from peripheral pixels in forming a captured image. Thus, the focus detecting pixels are discretely arranged rather than continuously in the image sensor 122. Thereby, the degradation of the taken image can be prevented.

As described with reference to FIGS. 3, 4A, 4B, 5A, and 5B, the image sensor 122 serves not only as image pickup means but also as focus detecting means. The phase difference AF is available as a focus detecting method using a focus detecting pixel configured to receive a light flux that divides the exit pupil 411.

Figure 6A:
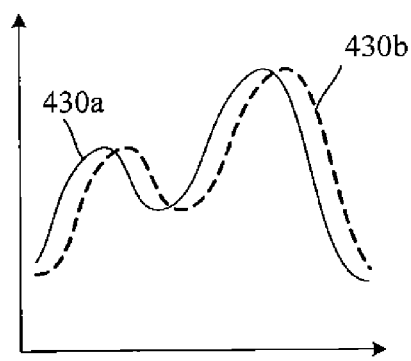
FIGS. 6A and 6B are views of a pair of focus detecting signals sent to an AF unit and a focus detecting area in an image pickup range.

FIG. 6A illustrates a pair of focus detecting signals sent to the image-pickup-plane phase-difference focus detector 129 after the image processor 124 provides a variety of corrections for the signal photoelectrically converted by the image sensor 122. In FIG. 6A, an abscissa axis denotes a pixel arrangement direction of the connected signal, and an ordinate axis denotes a signal intensity. The focus detecting signal 430a is formed by the focus detecting pixel $S_{HA}$ and the focus detecting signal and the 430b is formed by the focus detecting pixel $S_{HB}$. Since the lens unit 100 is in a defocus state to the image sensor 122, the focus detecting signal 430a shifts to the left side and the focus detecting signal 430b shifts to the right side. Since the image-pickup-plane phase-difference focus detector 129 can calculate a shift amount between the focus detecting signals 430a and 430b using a well-known correlative calculation, the lens unit 100 can known the defocus amount. The camera CPU 125 calculates a focus lens driving amount based upon the focus lens positional information sent from the lens MPU 117 and the defocus amount obtained from the image-pickup-plane phase-difference focus detector 129. Thereafter, the camera MPU 125 sends, based upon the focus lens positional information, to the lens MPU 117 positional information to which the focus lens 104 is to be driven. Thereby, focusing using the focusing means, such as the focus actuator 113, is available.

Figure 6B:
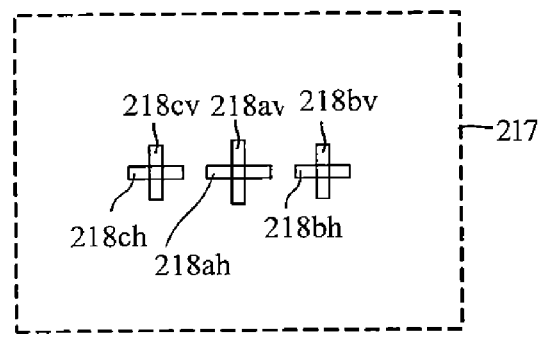

FIG. 6B is a view of a focus detecting area in the image pickup range, and the phase difference AF is performed by the image sensor 122 in this focus detecting area. The focus detecting area in FIG. 6B includes a focus detector that contains a pupil splitting pixel in the horizontal direction (lateral direction) of the image pickup lens illustrated in FIG. 5B, and a focus detector that contains a pupil splitting pixel in the vertical direction (longitudinal direction) of the image pickup lens. In FIG. 6B, a rectangle 217 illustrated by a dotted line denotes the image pickup range in which pixels of the image sensor 122 are formed. In the image pickup range, three vertical and horizontal focus detecting areas 218ah, 218bh, 218ch, 218av, 218bv, and 218cv are formed. The vertical and horizontal focus detecting areas are arranged orthogonal to each other (so-called cross-type focus detecting areas). This embodiment provides three, i.e., left, center, and right cross-type focus detecting areas in the image pickup range 217, as illustrated.

Referring now to FIGS. 1, 7, 8A, and 8B, a description will be given of the focusing and image pickup steps of the camera according to this embodiment.

Figure 7:
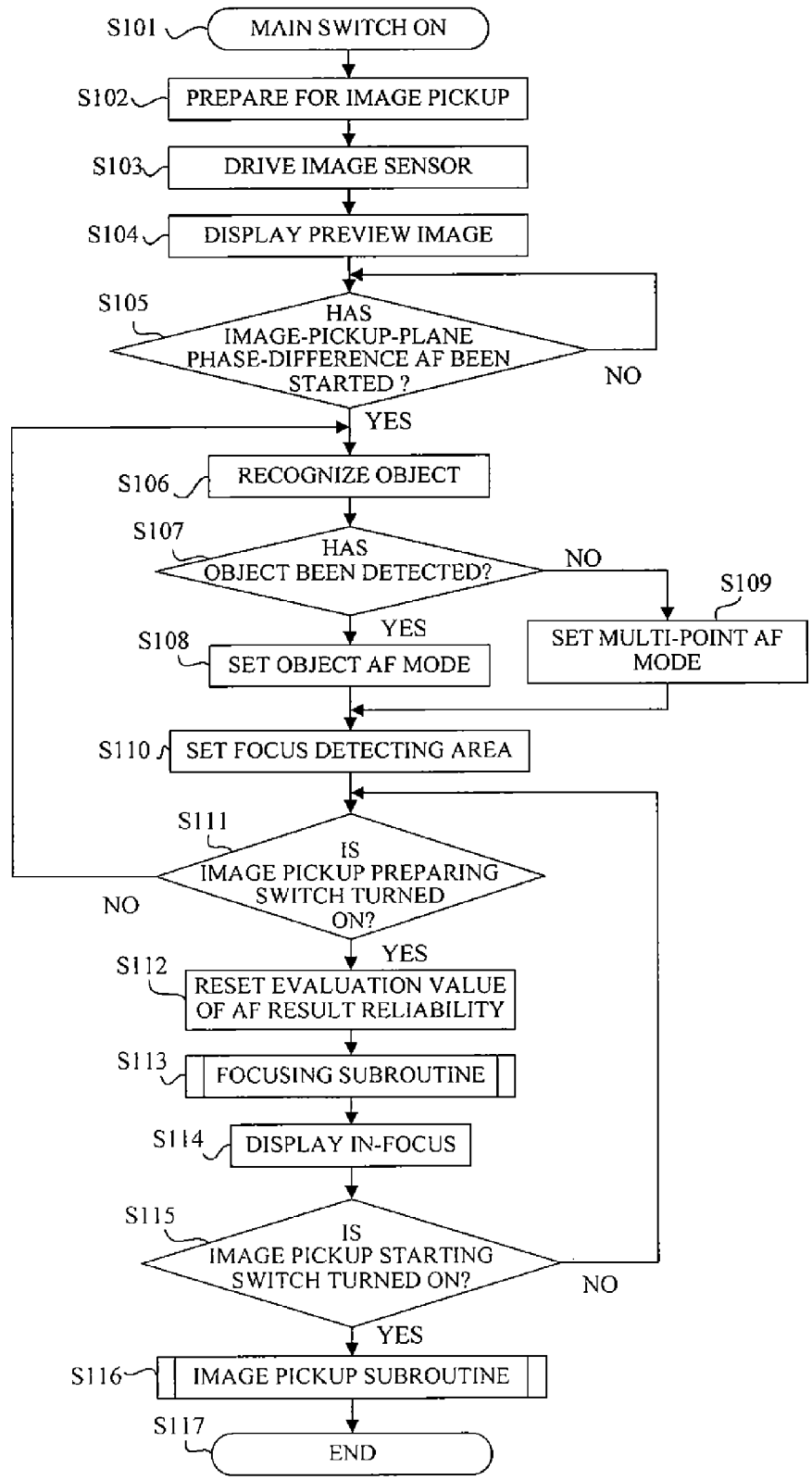
FIG. 7 is a main flowchart of an image pickup step of the digital camera.

FIG. 7 is a main flowchart of the image pickup step of the digital camera according to this embodiment. When a photographer turns on a power switch in the step S101, the camera MPU 125 confirms an operation of each actuator or image sensor in the camera, initializes the memory contents and execution program, and runs an image pickup preparation in the step S102.

In the step S103, the image sensor 122 starts capturing an image, and outputs a low resolution motion image for preview. In the step S104, the display unit 126 in the camera body 120 displays the read motion image. Then, the photographer visually inspects the displayed preview image, and determines a capturing composition.

In the step S105, it is determined whether or not the image-pickup-plane phase-difference AF is performed. If the image-pickup-plane phase-difference AF is not performed, the image-pickup-plane phase-difference AF is stood by. When the image-pickup-plane phase-difference AF is started, an object is recognized using the preview motion image in the step S106. Herein, the object is one that enables the camera to recognize a type of the object, such as a human face and an animal face, and may be one that has previously registered in the camera. In the step S107, it is determined whether or not the object has been recognized. When the object has been recognized, a focusing mode is set to an object AF mode in the step S108. Herein, the "object AF mode" is an AF mode in which an object recognized in the image pickup area is used as a focus detecting area for focusing. On the other hand, when the object has not yet been recognized, the focusing mode is set to a multi-point AF mode in the step S109. Herein, the "multi-point AF mode" is an AF mode in which areas in which the object is likely to exist are set to the focus detecting areas and the object in the focus detecting area is focused as illustrated in FIG. 6B.

When setting of the AF mode ends in the step S108 or S109, the focus detecting area is determined in the S110. In the step S111, it is determined whether or not an image pickup preparing switch is turned on. Unless it is turned on, the flow returns to the step S106 and the processing is repeated. When the image pickup preparing switch is turned on in the step S111, the evaluation value of the AF result reliability is reset in the step S112, and the focusing subroutine starts in the step S113. The evaluation value of the AF result reliability and the focusing subroutine will be described later.

When the processing of the focusing subroutine is completed, the in-focus state has been set and thus the in-focus is displayed in the step S114. Then, the flow moves to the step S115. In the step S115, it is determined whether or not the image pickup starting switch is turned on, and if not, the flow returns to the step S111 and the procedure continues. When the image pickup starting switch is turned on in the step S115, the image pickup subroutine is executed in the step S116. A detailed description of the image pickup subroutine will be given later. When the image pickup subroutine ends in the step S116, a series of image pickup actions is completed in the step S117.

Next follows a description of the focusing subroutine (the step S113) of FIG. 7. FIG. 1 is a flowchart of the focusing subroutine. When the main routine moves to the step S113 of this subroutine, an output of the focus detecting pixel contained in the focus detecting area determined in the step S110 is read out in the next step S301. Next, in the step S302, the focus detecting pixel as the defective pixel is processed, for example, by an interpolation using values of the surrounding pixels. The step S303 extracts a pair of image signals for which the correlative operation is performed, based upon the signal corrected by the step S302. The step S304 provides a correlative calculation for the two obtained image signals so as to calculate a relative positional shift amount between the two images.

Next follows a determination of the reliability of the correlative operation result in the step S305. The reliability of the correlative operation result means a coincidence between the two images: When the coincidence between the two images is high, the reliability of the focus detection result is generally high. When a plurality of focus detecting areas are selected, the more reliable information is preferentially utilized. In the step S306, a defocus amount is calculated using a conversion coefficient used to convert the image shift amount into the defocus amount and the detection result that is determined to be highly reliable by the S305. In the step S307, it is determined whether the defocus amount detected by the step S306 is the in-focus state. When the defocus amount is so small that the in-focus state can be determined, the focusing subroutine is completed in the step S315.

When there is no in-focus state in the step S307, it is determined by the step S308 whether or not the reliability of the detected defocus amount (AF result) can be evaluated. For the reliability of the AF result which will be described later, the evaluation value is calculated with a plurality of detected defocus amounts and the focus lens positions used for the focus detections. In the step S308, the just previous AF result and the focus lens position are obtained and stored. Then, it is determined whether the AF result and the focus lens position have been stored a number of times: If they have been stored, it is determined that the AF result reliability can be evaluated; if they have not yet been stored, it is not determined that the AF result reliability can be evaluated. When it is determined by the step S308 that the AF result reliability can be evaluated, the image-pickup-plane phase-difference detector 129 calculates the evaluation value of the AF result reliability in the step S310. The image-pickup-plane phase-difference detector 129 serves as a reliability determiner.

Figures 8A, 8B:
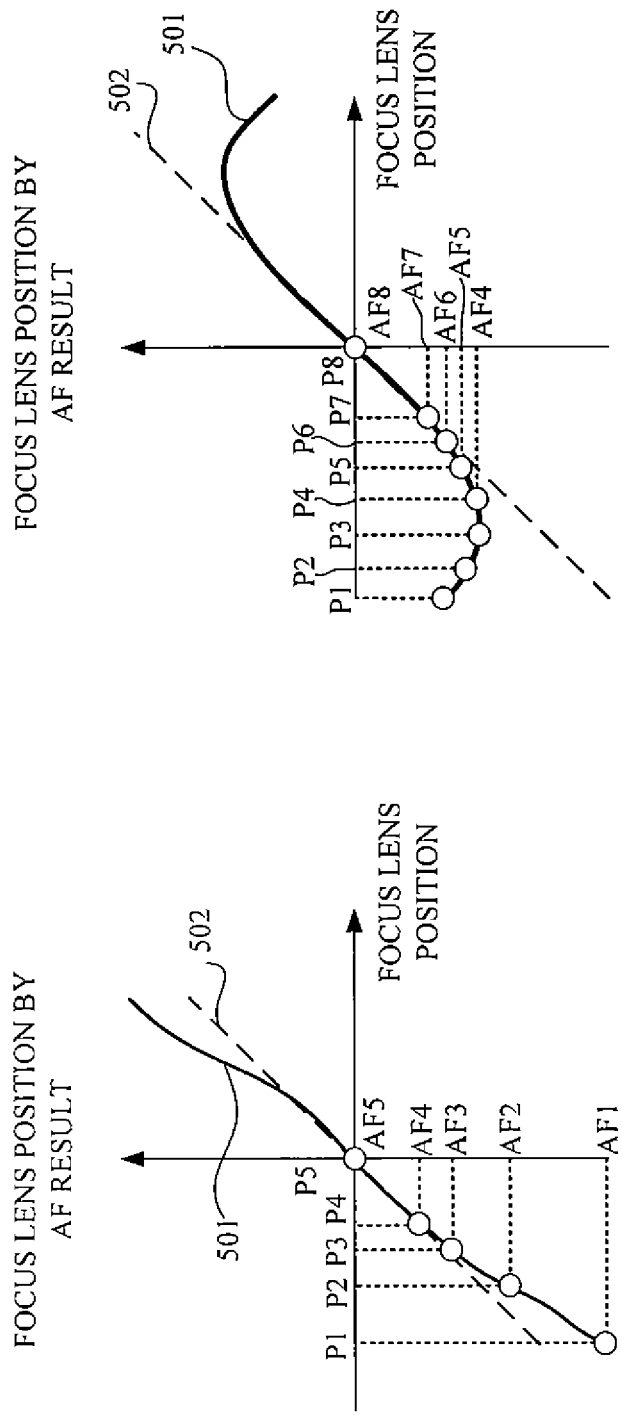
FIGS. 8A and 8B are views illustrating a relationship between a focus lens position and an AF result according to a first embodiment.

Referring now to FIGS. 8A and 8B, a description will be given of the evaluation value of the AF result reliability. FIGS. 8A and 8B illustrate a relationship between the focus lens position and the AF result. The abscissa axis denotes a position of the focus lens 104 by setting the in-focus position to the origin. The ordinate axis denotes a focus lens position calculated based upon a defocus amount (AF result) detected at each focus lens position by the image-pickup-plane phase-difference detector 129.

A solid line 501 in FIGS. 8A and 8B illustrates a relationship between the focus lens position and the AF result when there is a focus detecting error or when the above image-pickup-plane phase-difference AF is performed. In addition, a broken line 502 in FIGS. 8A and 8B illustrates a relationship between the focus lens position and the AF result when there is no focus detecting error at all. In FIGS. 8A and 8B, as the focus lens position becomes distant from the in-focus position as the origin, the solid line 501 becomes separated from the broken line 502. This means that as the defocus amount increases the error contained in the AF result increases. FIG. 8A illustrates that as the focus lens position becomes distant from the origin, a detecting error occurs in such a direction that the absolute value of the focus lens driving amount calculated from the AF result can increase. FIG. 8B illustrates that as the focus lens position becomes distant from the origin, a detecting error occurs in such a direction that the absolute value of the focus lens driving amount calculated based upon the AF result can decrease.

In general, as the defocus amount increases, the detecting error containing the AF result increases. A first cause of the increasing detecting error is a loss of the contrast of the image signal due to blurring of the obtained object image. A second cause is a lowered coincidence between the two image signals due to a partial projection of the obtained object image out of the focus detecting area because the image shift amount increases as the defocus amount increases. It is difficult to perfectly eliminate the influences of these causes although an improvement to some extent is available by correcting the signal output and by changing the focus detecting area.

Accordingly, this embodiment determines the reliability of the detected defocus amount through a plurality of focus detections. This decision enables a highly reliable focus detection result to be recognized at a position more distant from the in-focus position or more quickly, and accelerates focusing by moving the focus lens 104 to the in-focus position based upon the detected defocus amount.

Each of P1 to P5 in FIG. 8A illustrates a focus lens position in the focus detections, and AF1 to AF5 are (first to fifth) focus lens positions each calculated from the AF result in the focus detections. Similarly, in FIG. 8B, P1 to P8 correspond to AF1 to AF8. AF1 to AF3 in FIG. 8B are omitted for simplicity of the illustration.

An evaluation value E of the AF result reliability calculated in the step S310 in FIG. 1 is calculated based upon the following expression:

$$E=(AF(n+1)-AF(n))-(P(n+1)-P(n)) \quad (1)$$

In the expression 1, AF(n) represents AF1, AF2, . . . as AF results of the focus detection, and P(n) represents P1, P2, . . . as focus lens positions of the focus detection. The calculated evaluation value E of the AF result reliability is a difference between a difference between two AF results of the focus detections and a difference between two focus lens positions. A description will be given later of the reason why the AF result reliability can be evaluated by the expression 1. In the expression 1, P(n) corresponds to a first focusing state (when the focus lens is located at a first position), and P(n+1) corresponds to a second focusing state (when the focus lens is located at a second position). AF(n) corresponds to a first phase difference detection result (first focus lens positional information), and AF(n+1) corresponds to a second phase difference detection result (second focus lens positional information).

Turning back to the flowchart illustrated in FIG. 1, when the calculation of the evaluation value of the AF result reliability ends in the step S310, it is determined by the step S311 whether the absolute value of the evaluation value of the AF result reliability is equal to or smaller than a predetermined threshold (first value) (A). When the absolute value of the evaluation value of the AF result reliability is equal to or smaller than A (when the determination result indicates that the reliability of the AF result is high), K1 is set to a lens driving amount coefficient in the step S312. When the absolute value of the evaluation value of the AF result reliability is larger than A (when the determination result indicates that the reliability of the AF result is low), K2 is set to a lens driving amount coefficient in the step S309. In addition, when it is not determined that the AF result reliability can be evaluated in the step S308, K2 is set to the lens driving amount coefficient in the step S309. Herein, the lens driving amount to be set is a parameter used to calculate a final lens driving amount and multiplied by the lens driving amount obtained from the AF result. In the step S312, it has already been determined that the AF result is highly reliable, and 1 is set to K1 so as to set the lens driving amount obtained from the AF result exactly to the final lens driving amount. Herein, the lens driving amount coefficient K1 may be exactly 1 or a value of approximately 1 which is not 1 but within a permissible error range. On the other hand, in the step S309, it has already been determined that the reliability of the AF result is low or the AF result reliability cannot be evaluated, 0.25 is set to K2 so as to drive the lens with the lens driving amount obtained by the AF result multiplied by 0.25. Since this configuration reduces the lens driving amount unless it is determined that the AF result is highly reliable, going past of the in-focus position or so-called hunching can be prevented.

In the step S313, the focus lens 104 is driven by calculating an actual lens driving amount using the lens driving amount calculated based upon the AF result and the previously set lens driving coefficient. The image-pickup-plane phase-difference focus detector 129 serves as a driving amount calculator configured to calculate a driving amount of the focus lens 104. Thereafter, the flow returns to the step S301 and the focusing subroutine continues.

Referring now to FIGS. 1, 8A, and 8B, a description will be given of an illustrative focus detection and lens driving in focusing. In FIG. 8A, the first focus detection is initially performed at the focus lens position P1 and the AF1 is obtained as the AF result (S301 to S306). A value of AF1 is too large to determine the in-focus (No of S307). Since the AF result has not yet been stored a number of times, it is not determined that the AF result reliability can be evaluated (No of S308) and thus K2=0.25 is set to the lens driving amount coefficient (S309). Thereafter, the focus lens is driven by setting a value of AF1 multiplied by K2 to the lens driving amount (S313).

Next, the second focus detection is performed at the focus lens position P2, and the AF2 is obtained as the AF result. A difference between the focus lens position P2 for the current focus detection and the focus lens position P1 for the previous focus detection corresponds to a value of AF1 as the AF result multiplied by K2 (0.25).

Although a value of AF2 is too large to determine the in-focus (No of S307), the AF results AF1 and AF2 and the focus lens positions P1 and P2 are stored and thus the AF result reliability can be evaluated (Yes of S308). Next, the evaluation value E of the AF result reliability can be calculated based upon the expression 1. As illustrated in FIG. 8A, since P2-P1 is smaller than AF2-AF1, the evaluation value of the AF result reliability is positive. Next, the absolute value of the evaluation value of the calculated AF result reliability is determined to be larger than the threshold A (No of S311), and K2=0.25 is set to the lens driving amount coefficient (S309). Thereafter, the focus lens is driven by setting a value of AF2 multiplied by K2 to the lens driving amount (S313).

After the third focus detection is similarly completed, the fourth focus detection is performed at the focus lens position P4, and AF4 is obtained as the AF result (S301 to S306). A value of AF4 is too large to determine the in-focus (No of S307). Next, similar to the second and third focus detections, the evaluation value of the AF result reliability is calculated (S310). P4-P3 is approximately equal to AF4-AF3, and a value of E is close to 0. In other words, as illustrated in FIG. 8A, both white dots indicating the third and fourth focus detections exist on the broken line 502. This means that the focus detection results that contain no focus detecting errors have been obtained, and it is understood that the AF result reliability can be evaluated by the expression 1. When the focus detection result that contains no focus detecting error is obtained two times consecutively (AF3 and AF4 in this case), the driving amount of the focus lens (P4-P3 in this case) is equal to a difference between the focus detection results. By using this fact, the AF result reliability is evaluated by the expression 1.

Since the AF result reliability is maintained when a difference between the AF results is equal to a difference between the focus lens positions in the two focus detections, the evaluation value of the AF result reliability can be calculated as a difference between them as in the expression 1 but can be calculated as a ratio between them. In other words, the AF result reliability can be evaluated by comparing with a threshold A, a value made by subtracting 1 from a value made by dividing the difference between the AF results in the two focus detections by the difference between the focus lens positions.

Thereafter, the evaluation value of the AF result reliability is determined to be smaller than the threshold A (Yes of S311), and K1=1 is set to the lens driving coefficient (S312). Thereafter, the focus lens is driven by setting a value of AF4 multiplied by K1 to the lens driving amount (S313).

Next, the fifth focus detection is performed at a focus lens position P5, and AF5 is obtained as the AF result (S301 to S306). A value of AF5 is so small that the in-focus can be determined (Yes of S307). Thereby, the focusing subroutine is completed.

In FIG. 8B, similar to FIG. 8A, the in-focus is not obtained for P1 to P6 (No of S307), and it is not determined that the AF result reliability can be evaluated (No of S308) or it is determined that the absolute value of the evaluation value of the AF result reliability becomes larger than A (No of S311). Thus, the focus lens is driven by setting K2=0.25 to the lens driving amount coefficient. The seventh focus detection is performed at the focus lens position P7, and AF7 is obtained as the AF result. Then, it is determined that the evaluation value of the AF result reliability calculated based upon the stored focus lens position P6 and AF6 as the sixth AF result is smaller than the threshold A (Yes of S311). Thus, the K1=1 is set to the lens driving amount coefficient. Thereafter, the AF result (AF8) detected by the eighth focus detection is determined to be in-focus, and the focusing subroutine is completed.

Thus, the focus detection is performed while the reliability of the focus detection result is always evaluated. Therefore, high-speed focusing can be performed. For example, it is determined that the reliabilities of the focus detection results are high at the focus lens position P4 in FIG. 8A and the focus lens position P7 in FIG. 8B, and the focus lens can be moved to the in-focus position at once. When the reliability of the focus detection result cannot be determined, some focus detections are necessary and it needs a longer time for focusing.

While this embodiment uniformly sets the lens driving amount coefficient when there is no reliable focus detection result, this uniform setting is unnecessary. A threshold of the detected defocus amount may be provided: When it is larger than the threshold, the lens driving amount coefficient may be made smaller, and when it is smaller than the threshold, the lens driving amount coefficient may be made larger. Thereby, the lens driving amount can be made larger for a small defocus amount, so as to reduce the number of focus detections. This utilizes a fact that the focus detecting error becomes smaller as the defocus amount reduces, as described above.

This embodiment provides a focus detection using the focus detecting pixel provided on the image pickup plane, but the focus detection is not limited to this configuration. For example, a focus detector may be configured to provide focus detection through secondary imaging of a light flux that has transmitted the image pickup lens.

Second Embodiment

Figure 9:
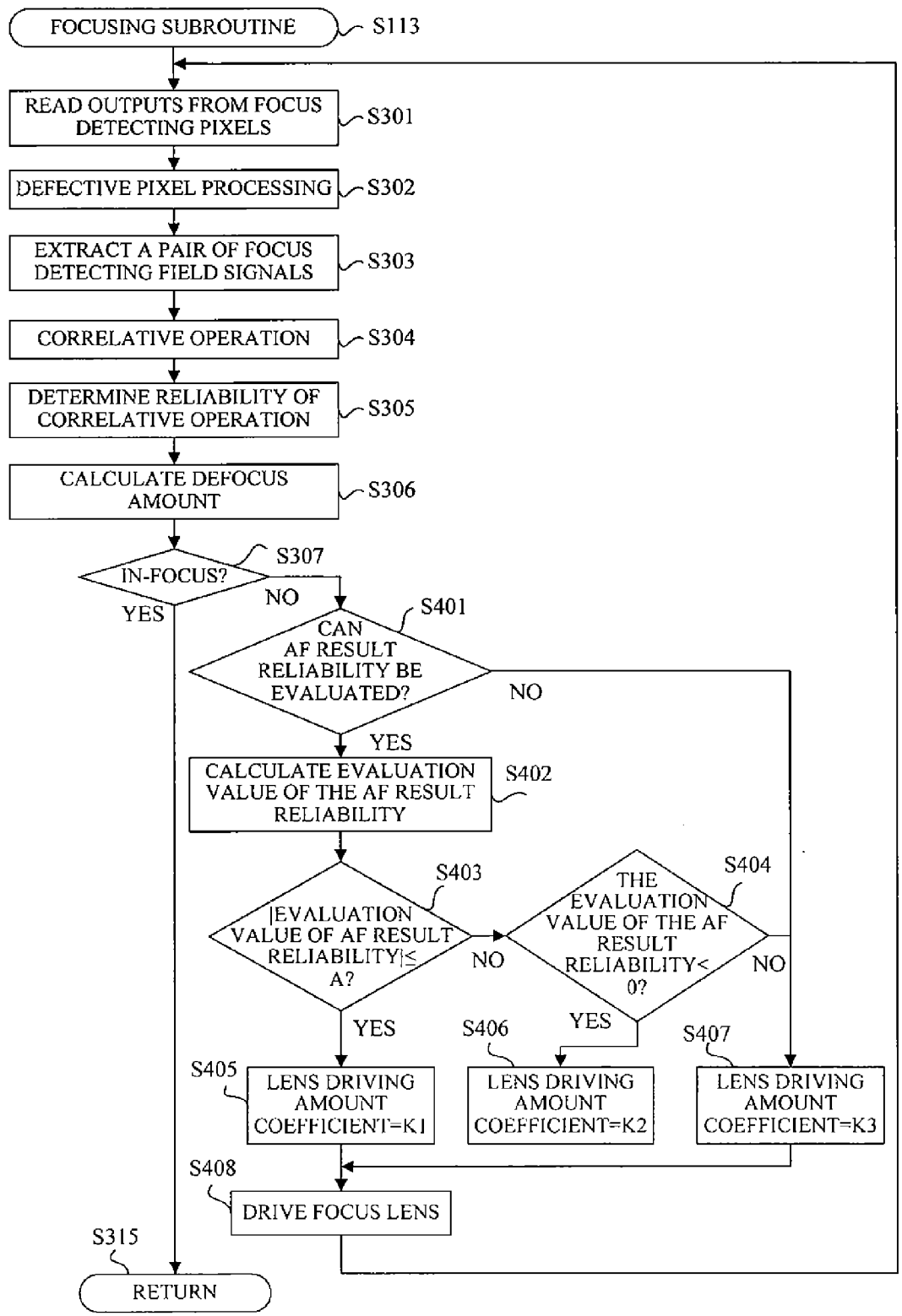
FIG. 9 is a flowchart of a focusing subroutine according to a second embodiment.

Referring now to FIGS. 9 to 11, a description will be given of a focusing apparatus according to a second embodiment of the present invention. The second embodiment is different from the first embodiment in that the second embodiment changes the lens driving amount coefficient in accordance with the evaluation value of the AF result reliability. Thereby, when a calculated value of the focus detection result is smaller particularly due to the focus detecting error, the number of focus detections can be reduced and high speed focusing can be realized.

The second embodiment also utilizes the block diagram (FIG. 2) of the digital camera having the focusing apparatus according to the first embodiment, the explanatory views of the focus detector (FIGS. 3 to 6A and 6B), and the main flowchart of the image pickup step of the digital camera (FIG. 7). Therefore, a detailed description thereof will be omitted.

FIG. 9 is a flowchart of a focusing subroutine of the step S113 of FIG. 7. When the main routine moves to the step S113 of this subroutine, the processing of S301 to S306 is performed. Since this processing is similar to that of the first embodiment, a description thereof will be omitted. In the step S307, it is determined whether the defocus amount detected by the step S306 is the in-focus state. When the defocus amount is so small that the in-focus state can be determined, the focusing subroutine is completed in the S315.

When there is no in-focus state in the step S307, it is determined by the step S401 whether or not the reliability of the detected defocus amount (AF result) can be evaluated. For the reliability of the AF result, as described above, the evaluation value is calculated with a plurality of detected defocus amounts and the focus lens positions used for the focus detections. In the step S401, initially, the just previous AF result and the focus lens position are obtained and stored. Then, it is determined whether the AF result and the focus lens position are stored a number of times: If they have been stored, it is determined that the AF result reliability can be evaluated; if they have not yet been stored, it is not determined that the AF result reliability can be evaluated. When it is determined by the step S401 that the AF result reliability can be evaluated, the evaluation value of the AF result reliability is calculated in the step S402.

When the calculation of the evaluation value of the AF result reliability is completed, it is determined by the step S403 whether the absolute value of the evaluation value of the AF result reliability is equal to or smaller than the predetermined threshold (A). When the absolute value of the evaluation value of the AF result reliability is equal to or smaller than the predetermined threshold (A), K1 is set to the lens driving amount coefficient in the step S405. When the absolute value of the evaluation value of the AF result reliability is larger than the predetermined threshold (A), a sign of the AF result reliability is determined in the step S404. When it is negative, K2 is set to the lens driving amount coefficient in the step S406. When it is determined by the step S404 that the evaluation value of the AF result reliability is positive or when it is not determined by the step S401 that the AF result reliability can be evaluated, K3 is set to the lens driving amount coefficient in the step S407. The lens driving amount coefficient to be set is a parameter used to calculate a final lens driving amount and multiplied by the lens driving amount obtained from the AF result. In the step S405, it has already been determined that the AF result is highly reliable, and 1 is set to K1 so as to set the lens driving amount obtained from the AF result exactly to the final lens driving amount.

On the other hand, since the reliability of the AF result has been determined to be low in the step S403 and the evaluation value of the AF result reliability is negative, K2=0.75 is set and in other cases, 0.25 is set to K3. Since this configuration reduces the lens driving amount unless it is determined that the AF result is highly reliable, going past of the in-focus position or so-called hunching can be prevented. Moreover, the lens driving amount coefficient K2 for the negative evaluation value of the AF result reliability is set larger than the lens driving amount coefficient K3 for the positive evaluation value of the AF result reliability. The reason will be described later.

In the step S408, the focus lens 104 is driven by calculating an actual lens driving amount using the previously set lens driving amount coefficient and the lens driving amount calculated from the AF result. Thereafter, the flow returns to the step S301 and the focusing subroutine continues.

Referring now to FIGS. 9, 10A, and 10B, a description will be given of an illustrative focus detection and lens driving in focusing. The setup of the axes of FIGS. 10A and a 10B, the lens positions, P1, P2, . . . , and AF results AF1, AF2, . . . , are similar to those of the first embodiment, and a description thereof will be omitted.

In FIG. 10A, the first focus detection is performed at the focus lens position P1 and AF1 is obtained as the AF result (S301 to S306). A value of the AF1 is too large high to determine the in-focus (No of S307). Since the AF result has not yet been stored a number of times, it is not determined that the AF result reliability can be evaluated (No of S401) and K3=0.25 is set to the lens driving amount coefficient (S407). Thereafter, the focus lens is driven by setting a value of AF1 multiplied by K3 to the lens driving amount (S408).

Next, the second focus detection is preformed at the focus lens position P2, and AF2 is obtained as the AF result. A difference between the focus lens position P2 for the current focus detection and the focus lens position P1 for the previous focus detection corresponds to a value of AF1 as the AF result multiplied by K3 (0.25).

Although AF2 is too large to determine the in-focus (No of S307), the AF results AF1 and AF2 and focus lens positions P1 and P2 are stored and thus the AF result reliability can be evaluated (Yes of S401). Next, the evaluation value E of the AF result reliability can be calculated based upon the expression 1. As illustrated in FIG. 10A, P2-P1 is smaller than AF2-AF1 and the evaluation value of the AF result reliability is positive. Next, since the absolute value of the calculated evaluation value of the AF result reliability is determined to be larger than the threshold A (No of S403) and the evaluation value of the AF result reliability is positive (No of S404), K3=0.25 is set to the lens driving amount coefficient (S407). Thereafter, the focus lens is driven by setting a value of AF2 multiplied by K3 to the lens driving amount (S408).

After the third focus detection is similarly completed, the fourth focus detection is performed at the focus lens position P4, and AF4 is obtained as the AF result (S301 to S306). A value of AF4 is too large to determine the in-focus (No of S307). Next, similar to the second and third focus detections, the evaluation value of AF result reliability is calculated (S402). P4-P3 is approximately equal to AF4-AF3, and a value of E is close to 0. In other words, as illustrated in FIG. 10A, both white dots indicating the third and fourth focus detections exist on the broken line 502. This means that the focus detection results that contain no focus detecting errors have been obtained.

Thereafter, the evaluation value of the AF result reliability is determined to be smaller than the threshold A (Yes of S403), and K1=1 is set to the lens driving amount coefficient (S405). Thereafter, the focus lens is driven by setting a value of AF4 multiplied by K1 to the lens driving amount (S408).

Next, the fifth focus detection is performed at a focus lens position P5, and AF5 is obtained as the AF result (S301 to S306). A value of AF5 is so small that the in-focus can be determined (Yes of S307). Thereby, the focusing subroutine is completed.

In FIG. 10B, similar to FIG. 10A, the first focus detection is performed at the focus lens position P1, and AF1 is obtained as the AF result (S301 to S306). A value of AF1 is too large to determine the in-focus (No of S307). In addition, since the AF result has not yet been stored a number of times and it is not determined that the AF result reliability can be evaluated (No of S401), K3=0.25 is set to the lens driving amount coefficient (S407). Thereafter, the focus lens is driven by setting a value of AF1 multiplied by K3 to the lens driving amount (S408).

Next, a second focus detection is preformed at a focus lens position P2, and AF2 is obtained as the AF result. A difference between the focus lens position P2 for the current focus detection and the focus lens position P1 for the previous focus detection corresponds to a value of AF1 as the AF result multiplied by K3 (0.25).

Although AF2 is too high to determine the in-focus (No of S307), the AF results AF1 and AF2 and focus lens positions P1 and P2 are stored and thus the AF result reliability can be evaluated (Yes of S401). Next, the evaluation value E of the AF result reliability is calculated based upon the expression 1. As illustrated in FIG. 10B, P2-P1 is a positive value while AF2-AF1 is a negative value, and the evaluation value of the AF result reliability becomes a negative value. Next, since the absolute value of the calculated evaluation value of the AF result reliability is determined to be larger than the threshold A (No of S403) and the evaluation value of the AF result reliability is a negative value (Yes of S404), K2=0.75 is set to the lens driving amount coefficient (S406). Thereafter, the focus lens is driven by setting a value of AF2 multiplied by K2 to the lens driving amount (S408).

After the third focus detection is similarly completed, the fourth focus detection is performed at the focus lens position P4, and AF4 is obtained as the AF result (S301 to S306). A value of AF4 is too large to determine the in-focus (No of S307). Next, similar to the second and third focus detections, the evaluation value of AF result reliability is calculated (S402). P4-P3 is approximately equal to AF4-AF3, and a value of E is close to 0. In other words, as illustrated in FIG. 10B, both white dots indicating the third and fourth focus detections exist on the broken line 502. This means that the focus detection results that contain no focus detecting errors have been obtained.

Thereafter, the evaluation value of the AF result reliability is determined to be smaller than the threshold A (Yes of S403), and K1=1 is set to the lens driving amount coefficient (S405). Thereafter, the focus lens is driven by setting a value of AF4 multiplied by K1 to the lens driving amount (S408).

Next, the fifth focus detection is performed at the focus lens position P5, and AF5 is obtained as the AF result (S301 to S306). A value of AF5 is so small that the in-focus can be determined (Yes of S307). Thereby, the focusing subroutine is completed.

Thus, when the evaluation value of the AF result reliability is positive, the calculated value of the focus detection result becomes larger due to the detecting error; when the evaluation value of the AF result reliability is negative, the calculated value of the focus detection result becomes smaller due to the detecting error. When the focus detection result is larger, the hunching can be prevented by setting a smaller value to the lens driving amount coefficient. When the focus detection result is smaller, a larger value is set to the lens driving amount coefficient for the reduced number of focus detections and accelerated focusing.

In addition, a set value the lens driving amount coefficient in the step S406 or S407 in FIG. 9 may be varied according to the evaluation value of the AF result reliability. Referring now to FIG. 11, a description will be given of a method for changing a set value according to the evaluation value of the AF result reliability.

FIG. 11 illustrates set values of the lens driving amount coefficients K2 and K3 classified according to the absolute value |E| of the evaluation value of the AF result reliability. A value other than 1 is set to the lens driving amount coefficients K2 and K3. For example, when the absolute value of the evaluation value of the AF result reliability is located between predetermined thresholds B and C, the lens driving amount coefficient K2 is set to 0.9.

A gradually reducing value is set to the lens driving amount coefficient K2 as the absolute value of the evaluation value of the AF result reliability reduces. This is because when the absolute value of the evaluation value of the AF result reliability is large or included between C and D, the error contained in the AF result reliability is large, and the focus detection result is determined to be smaller due to the error. Therefore, it can be determined that even when the lens driving amount calculated based upon the detected focus detection result is increased and used, the focus lens position does not go past the in-focus position. In FIG. 11, when the absolute value of the evaluation value of the AF result reliability is located between predetermined thresholds (second values) C and D, the lens driving amount coefficient K2 is set to 1.2 larger than 1. Similarly, as the absolute value of the evaluation value of the AF result reliability becomes smaller, the error contained in the focus detection result reduces and thus the lens driving amount coefficient is set to be smaller so that the driven focus lens cannot go past the in-focus position.

On the other hand, a gradually increasing value is set to the lens driving amount coefficient K3 as the absolute value of the evaluation value of the AF result reliability becomes smaller. This is because when the absolute value of the evaluation value of the AF result reliability is large or contained between C and D, the error contained in the AF result reliability is large, and the focus detection result is determined to be larger due to the error. Therefore, the lens driving amount calculated based upon the detected focus detection result is made smaller and used so that the focus lens position does not go past the in-focus position. Similarly, as the absolute value of the evaluation value of the AF result reliability becomes smaller, the error contained in the focus detection result reduces and thus the lens driving amount coefficient is set to be larger so that a larger lens driving amount can be maintained in a range in which the driven focus lens does not go past the in-focus position.

Thereby, the number of focus detections can be reduced and fast focusing can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The focusing apparatus according to the present invention is applicable to an image pickup apparatus, such as a video camera, a compact camera or a single-lens reflex camera.

This application claims the benefit of Japanese Patent Application No. 2012-057046, filed on Mar. 14, 2012 which is hereby incorporated by reference herein in its entirety.

What is claimed is:
1. A focusing apparatus comprising:
a photoelectric converter configured to photoelectrically convert at least a pair of optical images formed by light fluxes that have passed a focus lens and to output signals configured by at least a pair of image signals;
a detector configured to detect a phase difference between the pair of image signals based upon the signals from the photoelectric converter; and
a calculator configured to calculate a defocus amount based upon the signals from the photoelectric converter and the phase difference detected by the detector,
wherein the calculator changes a driving amount of the focus lens in accordance with information based upon a position of the focus lens and a changing amount between a first defocus amount and a second defocus amount, wherein the first defocus amount is calculated with the signals from the photoelectric converter when the focus lens is located at a first position, and the second defocus amount is calculated with the signals from the photoelectric converter when the focus lens is located at a second position, and
wherein the driving amount of the focus lens calculated based upon the phase difference is changed in accordance with a ratio between a difference between the first position and the second position of the focus lens, and a difference between a first defocus amount based on the phase difference detected by the detector in the case where the focus lens is located at the first position and a second defocus amount based on the phase difference detected by the detector in the case where the focus lens is located at the second position, the second position being a position where the focus lens is driven from the first position in accordance with the first defocus amount based on the phase difference detected by the detector.

2. The focusing apparatus according to claim 1, wherein the photoelectric converter photoelectrically converts the pair of optical images formed by the light fluxes that have passed different pupil areas in an image pickup optical system that includes the focus lens.

3. The focusing apparatus according to claim 1, wherein when an absolute value of a difference between a first focus lens position calculated from a first phase difference detection result by the detector and a second focus lens position calculated from a second phase difference detection result by the detector and the difference between the first position of the focus lens and the second position of the focus lens is smaller than a first value, the calculator sets the driving amount of the focus lens to a value smaller than that for the first value.

4. The focusing apparatus according to claim 1, further comprising a reliability determiner configured to determine a reliability of the phase difference detection result by the detector, the reliability determiner determining that the reliability of the phase difference detection result is high when an absolute value of a difference between a difference between a first focus lens position calculated from a first phase difference detection result by the detector and a second focus lens position calculated from a second phase difference detection result by the detector and the difference between the first position of the focus lens and the second position of the focus lens is smaller than a first value,
wherein the calculator changes the driving amount of the focus lens in accordance with a determination result by the reliability determiner.

5. The focusing apparatus according to claim 4, wherein the calculator multiplies the defocus amount calculated based upon the phase difference, by a lens driving amount coefficient and calculates the driving amount of the focus lens, and wherein the calculator uses the lens driving amount coefficient when the reliability is determined to be high by the reliability determiner, which is larger than the lens driving amount coefficient when the reliability is determined to be low by the reliability determiner.

6. The focusing apparatus according to claim 1, further comprising a reliability determiner configured to determine a reliability of a phase difference detection result of the detector, the reliability determiner determining that the reliability of the phase difference detection result is high when a difference between 1 and a ratio of a difference between a difference between a first focus lens position calculated from a first phase difference detection result by the detector and a second focus lens position calculated from a second phase difference detection result by the detector and the difference between the first position of the focus lens and the second position of the focus lens is smaller than a first value, wherein the calculator changes the driving amount of the focus lens in accordance with a determination result by the reliability determiner.

7. The focusing apparatus according to claim 1, wherein the calculator multiplies the defocus amount calculated based upon the phase difference, by a lens driving amount coefficient and calculates the driving amount of the focus lens, and wherein the calculator uses the lens driving amount coefficient when a value is negative which is made by subtracting the difference between the first position and the second position of the focus lens from a difference between a first focus lens position calculated from a first phase difference detection result by the detector and a second focus lens position calculated from a second phase difference detection result by the detector, larger than the lens driving amount coefficient when the value is positive.

8. The focusing apparatus according to claim 1, wherein the calculator multiplies the defocus amount calculated based upon the phase difference, by a lens driving amount coefficient and calculates the driving amount of the focus lens, and
  wherein the calculator makes the lens driving amount coefficient larger than 1, when a value is negative which is made by subtracting the difference between the first position and the second position of the focus lens from a difference between a first focus lens position calculated from a first phase difference detection result by the detector and a second focus lens position calculated from a second phase difference detection result by the detector, and the value has an absolute value larger than a predetermined value.

9. An image pickup apparatus comprising a focusing apparatus according to claim 1.

10. A focusing method comprising:
  an outputting step of photoelectrically converting at least a pair of optical images formed by light fluxes that have passed a focus lens and outputting signals configured by at least a pair of image signals;
  a detecting step of detecting a phase difference between the pair of image signals based upon the signals from the outputting step; and
  a calculating step of calculating a defocus amount based upon the signals from the outputting step and the phase difference detected by the detecting step,
  wherein the calculating step changes a driving amount of the focus lens in accordance with information based upon a position of the focus lens and a changing amount between a first defocus amount and a second defocus amount, wherein the first defocus amount is calculated with the signals from the outputting step when the focus lens is located at a first position, and the second defocus amount is calculated with the signals from the outputting step when the focus lens is located at a second position, and
  wherein the driving amount of the focus lens calculated based upon the phase difference is changed in accordance with a ratio between a difference between the first position and the second position of the focus lens, and a difference between a first defocus amount based on the phase difference detected by the detector in the case where the focus lens is located at the first position and a second defocus amount based on the phase difference detected by the detector in the case where the focus lens is located at the second position, the second position being a position where the focus lens is driven from the first position in accordance with the first defocus amount based on the phase difference detected by the detector.

* * * * *